US012427976B2

(12) United States Patent
Aoyama et al.

(10) Patent No.: US 12,427,976 B2
(45) Date of Patent: Sep. 30, 2025

(54) TRAVELING CONTROL APPARATUS (71) Applicant: SUBARU CORPORATION, Tokyo (JP)

(72) Inventors: Tsubasa Aoyama, Tokyo (JP); Yoshiyuki Igarashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 200 days.

(21) Appl. No.: 18/348,648

(22) Filed: Jul. 7, 2023

(65) Prior Publication Data
US 2024/0042998 A1 Feb. 8, 2024

(30) Foreign Application Priority Data

Aug. 4, 2022 (JP) ................. 2022-124945

(51) Int. Cl.
B60W 30/09 (2012.01)
B60W 30/16 (2020.01)
B60W 30/18 (2012.01)
B60W 60/00 (2020.01)
G08G 1/16 (2006.01)

(52) U.S. Cl.
CPC ............ B60W 30/09 (2013.01); B60W 30/16 (2013.01); B60W 30/18163 (2013.01); G08G 1/167 (2013.01); B60W 2520/00 (2013.01); B60W 2554/80 (2020.02)

(58) Field of Classification Search
CPC ................. B60W 30/09; B60W 30/16; B60W 30/18163; B60W 1/167; B60W 2520/00; B60W 2554/80; B60W 60/001; B60W 2554/20; B60W 2554/4045; B60W 2554/801; B60W 30/18145; B60W 30/18159; G08G 1/16
USPC .......................................... 701/301
See application file for complete search history.

(56) References Cited

U.S. PATENT DOCUMENTS

| 11,662,733 | B2* | 5/2023 | Kindo | B60W 50/0097 |
| | | | | 701/26 |
| 2020/0331470 | A1* | 10/2020 | Nanri | B60W 30/09 |
| 2022/0089185 | A1* | 3/2022 | Hiramatsu | B60W 30/0956 |

FOREIGN PATENT DOCUMENTS

JP 2011-162075 A 8/2011

* cited by examiner

Primary Examiner — Rachid Bendidi
Assistant Examiner — Hossam M Abd El Latif
(74) Attorney, Agent, or Firm — Rimon P.C.

(57) ABSTRACT

A traveling control apparatus includes an obstacle detection unit, a detour determination unit, first and second on-road parking determination unit, first and second target lateral position determination units, and a traveling control processor. When an obstacle is highly likely or likely to be a second vehicle parked on the road, the first target lateral position determination unit determines a first target lateral position. When the obstacle is determined to be the second vehicle parked on the road, the second target lateral position determination unit determines a second target lateral position. When the obstacle is determined not to be the second vehicle parked on the road and there is a detour, the second target lateral position determination unit determines a third target lateral position. The traveling control processor controls a first vehicle based on a result of determining by the first or second target lateral position determination unit.

20 Claims, 8 Drawing Sheets

FIG. 8 ered side by side along the road, the parking determination unit is configured to perform the

TRAVELING CONTROL APPARATUS

CROSS-REFERENCE TO RELATED APPLICATIONS

The present application claims priority from Japanese Patent Application No. 2022-124945 filed on Aug. 4, 2022, the entire contents of which are hereby incorporated by reference.

BACKGROUND

The present disclosure relates to a traveling control apparatus. In recent years, driving assistance systems that assist driving operations of drivers of vehicles, such as automobiles, have been put into practical use and widely used to secure safety driving of the vehicles while reducing burdens on the drivers.

Recent years have seen developments in the driving assistance systems and an appearance of an advanced driving assistance system that performs driving assistance in accordance with driving characteristics of a driver without making the driver feel strange. Reference is made to Japanese Unexamined Patent Application Publication (JP-A) No. 2011-162075.

SUMMARY

An aspect of the disclosure provides a traveling control apparatus configured to perform traveling control of a first vehicle to which the traveling control apparatus is applied at an intersection of a road where the first vehicle is going to turn right. The traveling control apparatus includes an obstacle detection unit, a detour determination unit, a first on-road parking determination unit, a first target lateral position determination unit, a second on-road parking determination unit, a second target lateral position determination unit, and a traveling control processor. The obstacle detection unit is configured to detect an obstacle present before the intersection and in right front of the first vehicle. The detour determination unit is configured to determine whether there is a detour when the first vehicle is hindered by the obstacle from turning right at the intersection. When the obstacle is detected, the first on-road parking determination unit is configured to perform a first on-road parking determination process to determine a likelihood of the obstacle being a second vehicle parked on the road. When the first on-road parking determination unit determines that the obstacle is highly likely or likely to be the second vehicle parked on the road, the first target lateral position determination unit is configured to determine a first target lateral position along which the first vehicle is to travel to pass by the second vehicle. After the first vehicle starts overtaking the second vehicle, the second on-road parking determination unit is configured to perform a second on-road parking determination process to determine whether the obstacle is the second vehicle parked on the road. When the second on-road parking determination unit determines that the obstacle is the second vehicle parked on the road, the second target lateral position determination unit determines a second target lateral position along which the first vehicle is to travel to pass by the second vehicle. When the second on-road parking determination unit determines that the obstacle is not the second vehicle parked on the road and the detour determination unit determines that there is the detour, the second target lateral position determination unit determines a third target lateral position along which the first vehicle is to travel to pass by the second vehicle. The traveling control processor is configured to perform the traveling control of the first vehicle based on a result of determining by the first target lateral position determination unit or a result of determining by the second target lateral position determination unit. The traveling control of the first vehicle includes traveling control to cause the first vehicle to overtake the second vehicle, traveling control to cause the first vehicle to travel straight, traveling control to cause the first vehicle to turn right, traveling control to cause the first vehicle to travel on the detour, and adaptive cruise control to keep an inter-vehicular distance between the first vehicle and the second vehicle.

An aspect of the disclosure provides a traveling control apparatus configured to perform traveling control of a first vehicle to which the traveling control apparatus is applied at an intersection of a road where the first vehicle is going to turn right. The traveling control apparatus includes circuitry configured to: detect an obstacle present before the intersection and in right front of the first vehicle; perform a detour determination as to whether there is a detour when the first vehicle is hindered by the obstacle from turning right at the intersection; upon detecting the obstacle, perform a first on-road parking determination process to determine a likelihood of the obstacle being a second vehicle parked on the road; upon determining in the first on-road parking determination process that the obstacle is highly likely or likely to be the second vehicle parked on the road, perform a first target lateral position determination process to determine a first target lateral position along which the first vehicle is to travel to pass by the second vehicle; perform a second on-road parking determination process to determine whether the obstacle is the second vehicle parked on the road after the first vehicle starts overtaking the second vehicle; perform a second target lateral position determination process to, upon determining in the second on-road parking determination process that the obstacle is the second vehicle parked on the road, determine a second target lateral position along which the first vehicle is to travel to pass by the second vehicle and, upon determining in the second on-road parking determination process that the obstacle is not the second vehicle parked on the road and determining in the detour determination that there is the detour, determine a third target lateral position along which the first vehicle is to travel to pass by the second vehicle; and perform traveling control of the first vehicle based on a result of the first target lateral position determination process or a result of the second target lateral position determination process. The traveling control of the first vehicle includes traveling control to cause the first vehicle to overtake the second vehicle, traveling control to cause the first vehicle to travel straight, traveling control to cause the first vehicle to turn right, traveling control to cause the first vehicle to travel on the detour, and adaptive cruise control to keep an inter-vehicular distance between the first vehicle and the second vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

When an own vehicle is hindered by another vehicle that is likely to be parked on a road before an intersection from turning left at the intersection, an advanced driving assistance system described in JP-A No. 2011-162075 is only able to stop the own vehicle through adaptive cruise control (ACC), finding it difficult to achieve traveling assistance in guiding the own vehicle to a destination.

It is desirable to provide a traveling control apparatus that makes it possible to allow the own vehicle to pass through a narrow space before the intersection in accordance with the width of a road on which the own vehicle is traveling, even when another vehicle that is likely to be parked on the road is present before the intersection in which the own vehicle is going to turn left, and to thereby achieve traveling assistance of the own vehicle to a destination.

Example Embodiment

A traveling control apparatus 1 according to an example embodiment of the disclosure is described below with reference to FIG. 1 to 8.

In the following example embodiment, a description is given assuming that vehicles are to keep to the left while traveling. As a matter of course, the traveling control apparatus 1 is applicable to roads in countries or regions where vehicles are to keep to the right by interchanging left and right settings or the like described below with each other.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Configuration of Traveling Control Apparatus 1>

Figure 1:
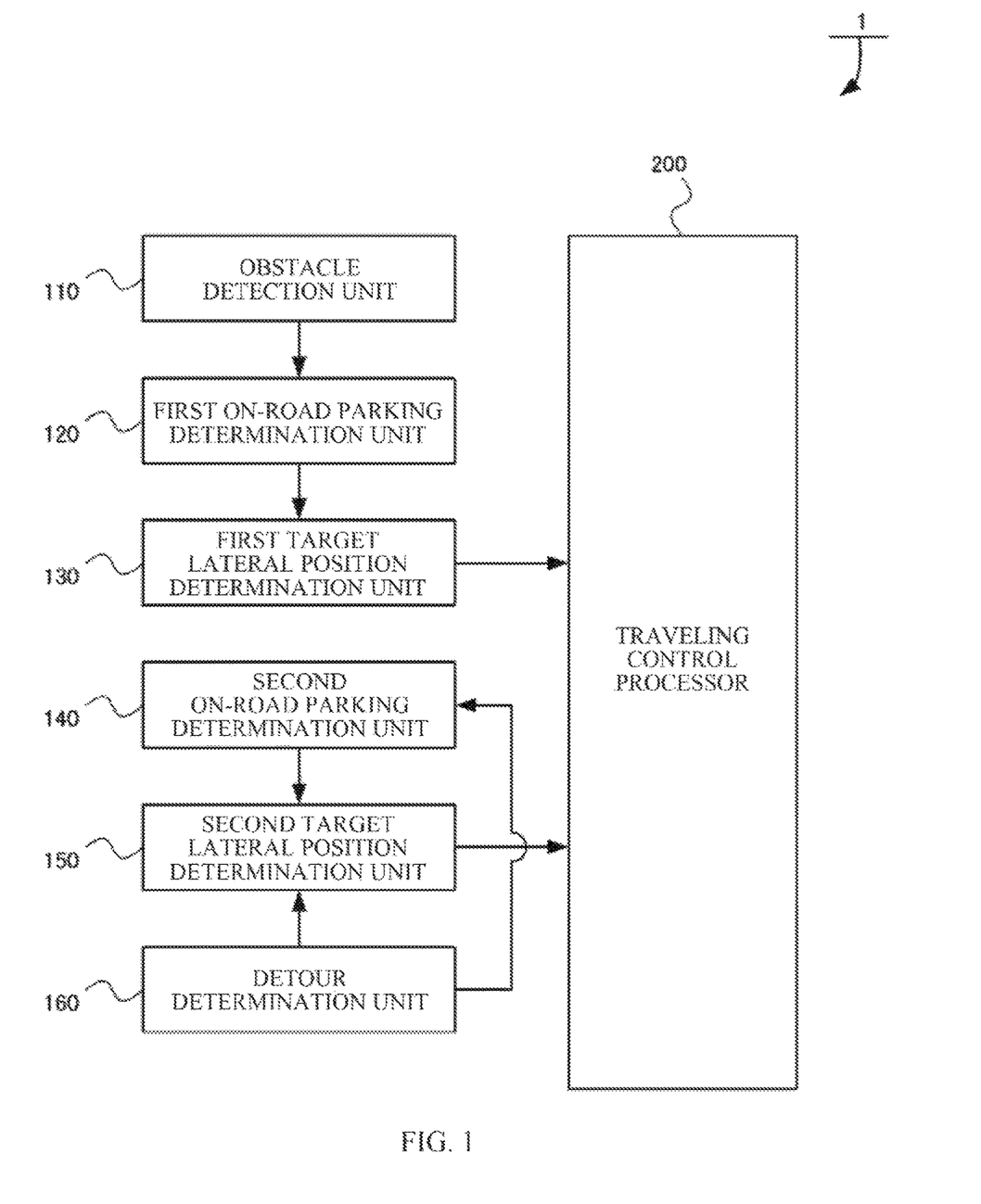
FIG. 1 is a block diagram illustrating an exemplary configuration of a traveling control apparatus according to one example embodiment of the disclosure.

As illustrated in FIG. 1, the traveling control apparatus 1 according to the example embodiment includes an obstacle detection unit 110, a first on-road parking determination unit 120, a first target lateral position determination unit 130, a second on-road parking determination unit 140, a second target lateral position determination unit 150, a detour determination unit 160, and a traveling control processor 200.

The obstacle detection unit 110 detects an obstacle present before an intersection of a road and in left front of an own vehicle MV going to turn left at the intersection. In one embodiment, the own vehicle MV may serve as a "first vehicle".

The obstacle detection unit 110 may be, for example, an imaging device. In one example, the obstacle detection unit 110 may determine whether an obstacle is present before the intersection and in left front of the own vehicle MV going to turn left at the intersection by analyzing an image of an environment in front of the own vehicle MV.

Optionally, the obstacle detection unit 110 may be provided with a LIDAR or a millimeter-wave radar in preparation for unseasonable weather, for example.

When the obstacle detection unit 110 detects the obstacle, the result of the detection may be outputted to the first on-road parking determination unit 120 to be described later.

When the obstacle detection unit 110 detects the obstacle present before the intersection and in left front of the own vehicle MV going to turn left at the intersection, the first on-road parking determination unit 120 performs a first on-road parking determination process to determine whether the obstacle is another vehicle OV, and when the obstacle is the other vehicle OV, determine the likelihood of the other vehicle OV being a vehicle parked on the road. In one embodiment, the other vehicle OV may serve as a serving as a "second vehicle".

Figure 4:
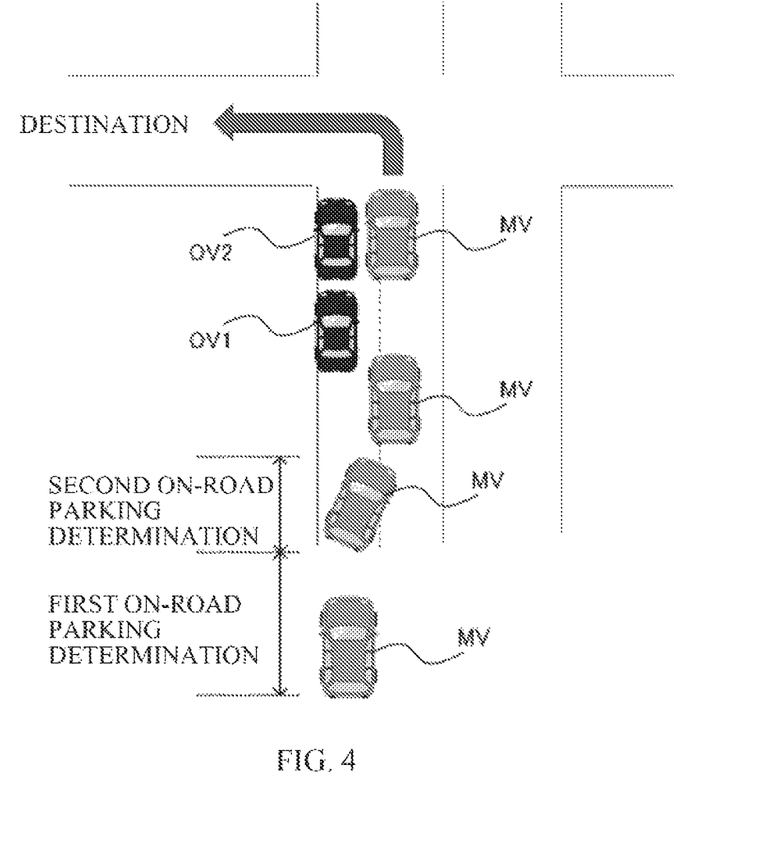
FIG. 4 is a diagram schematically illustrating the first on-road parking determination process and the second on-road parking determination process to be performed by the traveling control apparatus according to one example embodiment of the disclosure.

For example, as illustrated in FIG. 4, the first on-road parking determination unit 120 may determine, in a first on-road parking determination section, whether other vehicles OV1 and OV2 are highly likely, likely, or less likely to be parked on the road, based on information on the other vehicles OV1 and OV2. The information on the other vehicles OV1 and OV2 may include, for example, the following indices: dynamic behaviors of the other vehicles OV1 and OV2, lighting states of hazard lamps of the other vehicles OV1 and OV2, lighting states of turn signal lamps of the other vehicles OV1 and OV2, directions indicated by the turn signal lamps of the other vehicles OV1 and OV2, orientations of the wheels of the other vehicles OV1 and OV2, the presence of drivers in the other vehicles OV1 and OV2, and behaviors of the drivers in the other vehicles OV1 and OV2.

The determination at the first on-road parking determination unit 120 may be made based on how many indices out of those described above satisfy respective conditions. Alternatively, the first on-road parking determination unit 120 may assign weight to some of the above-described indices that greatly affect the determination (including the presence of a driver), and may determine the three levels of the likelihood described above, based on a total evaluation value calculated as a result of the weighting, for example.

The result of the determination at the first on-road parking determination unit 120 may be outputted to the first target lateral position determination unit 130 to be described later.

When the first on-road parking determination unit 120 determines that the other vehicle OV is highly likely to be parked on the road, the first target lateral position determination unit 130 determines a first target lateral position along which the own vehicle MV is to travel to pass by the other vehicle OV.

In one example, when the first on-road parking determination unit 120 determines that the other vehicle OV is highly likely to be parked on the road, the first target lateral position determination unit 130 may set the first target lateral position at a short distance from the other vehicle OV. When the first on-road parking determination unit 120 determines that the other vehicle OV is likely to be parked on the road, the first target lateral position determination unit 130 may set the first target lateral position at a middle-length distance from the other vehicle. When the first on-road parking determination unit 120 determines that the other vehicle OV is less likely to be parked on the road, the first on-road parking determination unit 120 may determine that the own vehicle MV is not permitted to overtake the other vehicle OV.

Figure 5:
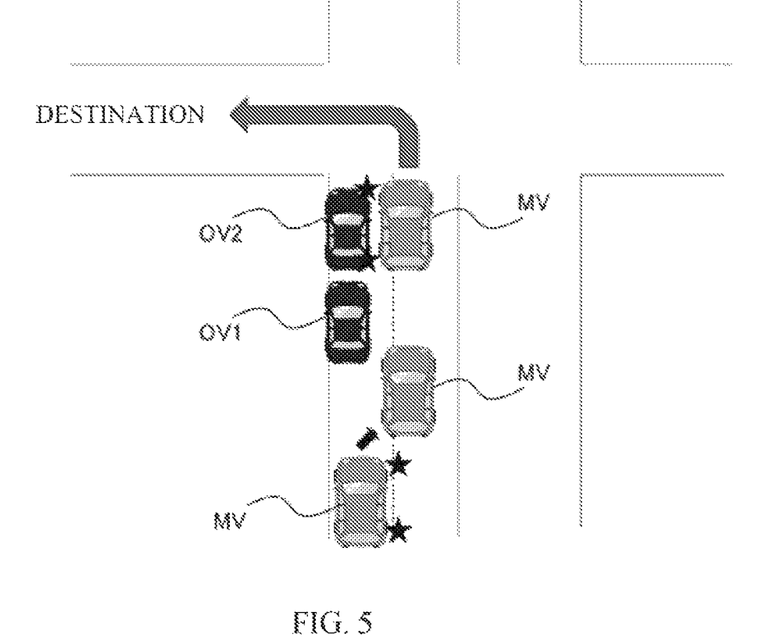
FIG. 5 is a diagram schematically illustrating the first on-road parking determination process and the second on-road parking determination process to be performed by the traveling control apparatus according to one example embodiment of the disclosure.

In more detail, when the first on-road parking determination unit 120 determines that the other vehicle OV is highly likely to be parked on the road, the first target lateral position determination unit 130 may set the first target lateral position such that the distance between the own vehicle MV and the other vehicles OV1 and OV2 in a vehicle-width direction will be a short distance as illustrated in FIG. 5.

When the first on-road parking determination unit 120 determines that the other vehicles OV1 and OV2 are likely to be parked on the road, the first target lateral position determination unit 130 may set the first target lateral position such that the distance between the own vehicle MV and the other vehicles OV1 and OV2 in the vehicle-width direction will be a middle-length distance.

The result of the determination at the first target lateral position determination unit 130 may be outputted to the traveling control processor 200 to be described later.

Note that, when the other vehicle OV is highly likely to be parked on the road or likely to be parked on the road, the first target lateral position determination unit 130 may output data for controlling the turn signal lamps of the own vehicle MV together with the result of the determination described above. In FIG. 5, a star mark represents a turn signal lamp of the own vehicle MV turned on. The same applies to the other drawings.

After the own vehicle MV starts overtaking the other vehicle OV, the second on-road parking determination unit 140 performs a second on-road parking determination process to determine whether the obstacle is the other vehicle OV, and when the obstacle is the other vehicle OV, determine whether the other vehicle OV is parked on the road.

For example, as illustrated in FIG. 4, the second on-road parking determination unit 140 may determine, in a second on-road parking determination section, whether the other vehicles OV1 and OV2 are certainly parked on the road based on the information on the other vehicles OV1 and OV2. The information on the other vehicles OV1 and OV2 may include, for example, the following indices: dynamic behaviors of the other vehicles OV1 and OV2, lighting states of the hazard lamps of the other vehicles OV1 and OV2, lighting states of turn signal lamps of the other vehicles OV1 and OV2, directions indicated by the turn signal lamps of the other vehicles OV1 and OV2, orientations of the wheels of the other vehicles OV1 and OV2, the presence of drivers in the other vehicles OV1 and OV2, and behaviors of the drivers in the other vehicles OV1 and OV2.

The determination at the second on-road parking determination unit 140 may be made based on how many indices out of those described above satisfy respective conditions. Alternatively, the second on-road parking determination unit 140 may assign weight to some of the above-described indices that greatly affect the determination (including the presence of a driver), and may made the determination, based on a total evaluation value calculated as a result of the weighting, for example.

The result of the determination at the second on-road parking determination unit 140 may be outputted to the second target lateral position determination unit 150 to be described later.

When the second on-road parking determination unit 140 determines that the obstacle is the other vehicle OV parked on the road, the second target lateral position determination unit 150 may determine a second target lateral position along which the own vehicle MV is to travel to pass by the other vehicle OV.

In one example, when the second on-road parking determination unit 140 determines that the obstacle is certainly the other vehicle parked on the road, the second target lateral position determination unit 150 may set the second target lateral position at a short distance from the other vehicle OV.

When the second on-road parking determination unit 140 determines that the obstacle is not the other vehicle OV parked on the road and the detour determination unit 160 to be described later determines that there is a detour, the second target lateral position determination unit 150 may determine a third target lateral position along which the own vehicle MV is to travel to pass by the other vehicle OV.

In one example, when the second on-road parking determination unit 140 determines that the obstacle is certainly not the other vehicle parked on the road and the detour determination unit 160 determines that there is a detour, the second target lateral position determination unit 150 may set the third target lateral position at a long distance from the other vehicle OV.

Further, when the second on-road parking determination unit 140 determines that the obstacle is certainly not the other vehicle OV parked on the road and the detour determination unit 160 to be described later determines that there is no detour, the second target lateral position determination unit 150 may determine the second target lateral position along which the own vehicle MV is to travel to pass by the other vehicle OV.

In one example, when the second on-road parking determination unit 140 determines that the obstacle is certainly not the other vehicle parked on the road and the detour determination unit 160 determines that there is no detour, the second target lateral position determination unit 150 may set the second target lateral position at zero (0).

The result of the determination at the second target lateral position determination unit 150 may be outputted to the traveling control processor 200 to be described later.

The detour determination unit 160 may determine whether there is a detour when the own vehicle MV is hindered by the other vehicle OV from turning left at the intersection that the own vehicle MV is approaching.

The result of the determination at the detour determination unit 160 may be outputted to the traveling control processor 200 to be described later.

The traveling control processor 200 performs traveling control of the own vehicle MV. The traveling control of the own vehicle MV includes traveling control to cause the own vehicle MV to overtake other vehicle OV, traveling control to cause the own vehicle MV to travel straight, traveling control to cause the own vehicle MV to turn left, traveling control to cause the own vehicle MV to travel on the detour, and adaptive cruise control (ACC) to keep an inter-vehicular distance between the own vehicle MV and the other vehicle OV.

Further, the traveling control processor 200 may perform control to turn on/off the turn signal lamps of the own vehicle MV in accordance with the traveling control mode described above.

Figure 6:
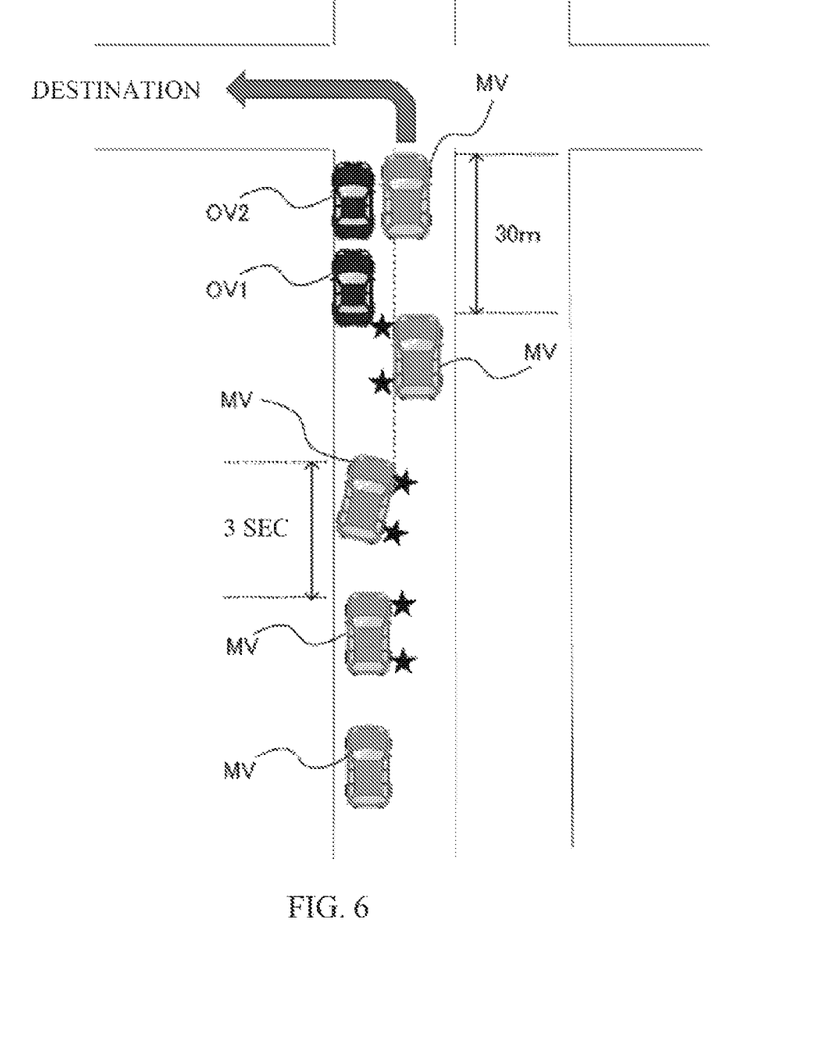
FIG. 6 is a diagram schematically illustrating an exemplary process of traveling control to be performed by a traveling control processor of the traveling control apparatus according to one example embodiment of the disclosure when an own vehicle is to overtake another vehicle.

In one example, as illustrated in FIG. 6, when the first on-road parking determination unit 120 determines that the other vehicles OV1 and OV2 are highly likely to be parked on the road, the traveling control processor 200 may perform control to turn on a right turn signal lamp of the own vehicle MV before the own vehicle MV is moved laterally to overtake the other vehicles OV1 and OV2, and may perform the traveling control to cause the own vehicle MV to travel along the first target lateral position to overtake the other vehicles OV1 and OV2. Thereafter, when the second on-road parking determination unit 140 determines that the other vehicles OV1 and OV2 are parked on the road, the traveling control processor 200 may perform control to turn off the right turn signal lamp of the own vehicle MV, the traveling control to cause the own vehicle MV to travel straight along the second target lateral position, and the traveling control to cause the own vehicle MV to turn left.

In addition, when the first on-road parking determination unit 120 determines that the other vehicles OV1 and OV2 are highly likely to be parked on the road, the traveling control processor 200 may perform the control to turn on the right turn signal lamp of the own vehicle MV before the own vehicle MV is moved laterally to overtake the other vehicles OV1 and OV2, and may perform the traveling control to cause the own vehicle MV to travel along the first target lateral position to overtake the other vehicles OV1 and OV2. Thereafter, when the second on-road parking determination unit 140 determines that the other vehicles OV1 and OV2 are not parked on the road and the detour determination unit 160 determines that there is no detour, the traveling control processor 200 may perform the adaptive cruise control (ACC) to keep the inter-vehicular distance between the own vehicle MV and the other vehicle OV, for example.

Herein, the phrase "before the own vehicle MV is moved laterally" may refer to three seconds before the own vehicle MV is moved laterally, for example.

According to the road traffic law in Japan, the own vehicle MV is required to turn on a turn signal lamp to indicate a direction in which the own vehicle MV is going to enter at least three seconds before moving laterally to change the traveling course.

That is, after turning on the turn signal lamp, the own vehicle MV is required to continue traveling on a current traveling lane in at least three seconds without changing the traveling course.

When the first on-road parking determination unit 120 determines that the other vehicles OV1 and OV2 are less likely to be parked on the road, the traveling control processor 200 may perform the ACC to keep the inter-vehicular distance between the own vehicle MV and the other vehicle OV, for example.

Note that, as illustrated in FIG. 6, before performing the traveling control to cause the own vehicle MV to turn left, the traveling control processor 200 may perform the control to turn on the left turn signal lamp of the own vehicle MV at a position 30 meters before the intersection in which the own vehicle MV is going to turn left.

Figure 7:
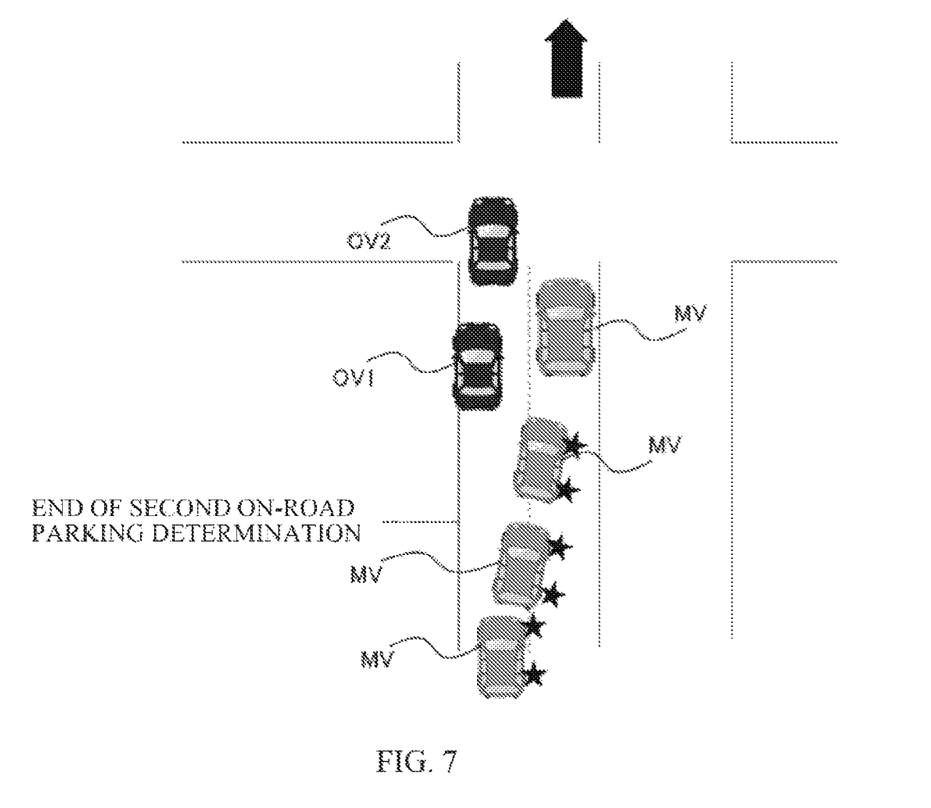
FIG. 7 is a diagram schematically illustrating an exemplary process of traveling control to be performed by the traveling control processor of the traveling control apparatus according to one example embodiment of the disclosure when there is a detour.

In addition, when the first on-road parking determination unit 120 determines that the other vehicles OV1 and OV2 are highly likely to be parked on the road, the traveling control processor 200 may perform the control to turn on the right turn signal lamp of the own vehicle MV and the traveling control to cause the own vehicle MV to travel along the first target lateral position to overcome the other vehicles OV1 and OV2, for example.

Thereafter, when the second on-road parking determination unit 140 determines that the other vehicle OV is not parked on the road and the detour determination unit 160 determines that there is a detour, the traveling control processor 200 may perform the traveling control to cause the own vehicle MV to travel on the detour along the second target lateral position, as illustrated in FIG. 7.

Figure 8:
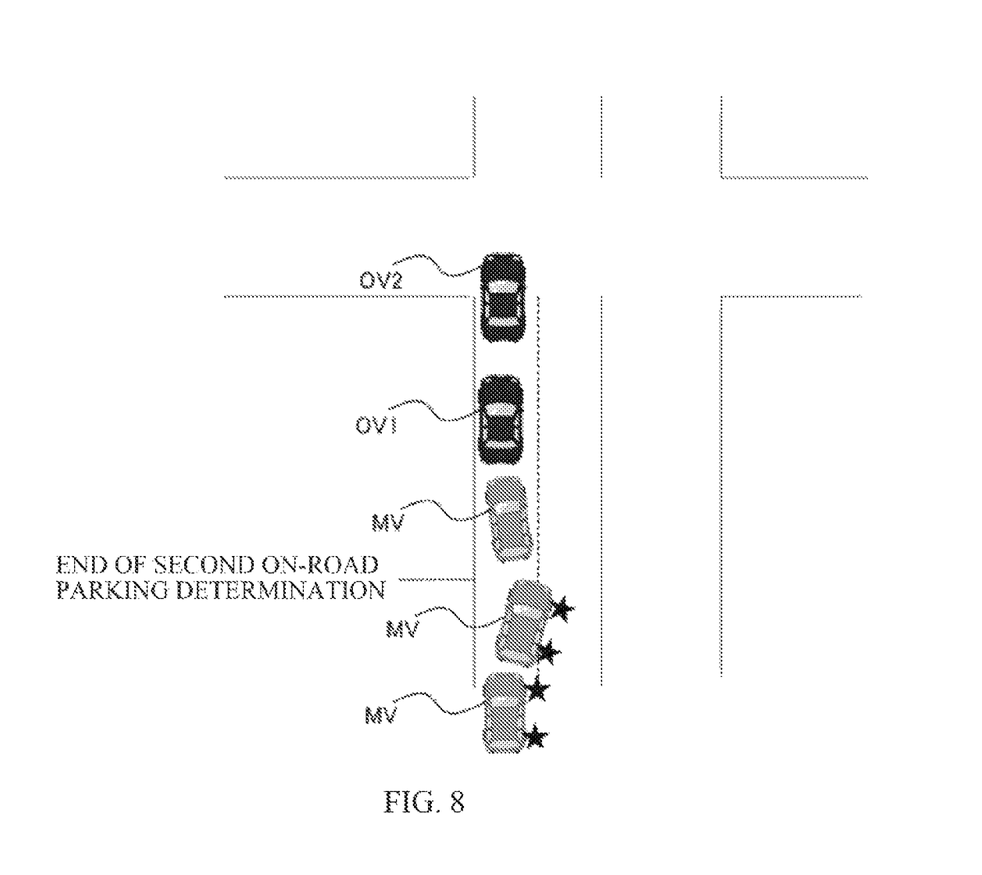
FIG. 8 is a diagram schematically illustrating an exemplary process of traveling control to be performed by the traveling control processor of the traveling control apparatus according to one example embodiment of the disclosure when there is no detour.

Further, when the second on-road parking determination unit 140 determines that the other vehicle OV is not parked on the road and the detour determination unit 160 determines that there is no detour, the traveling control processor 200 may perform the ACC to keep the inter-vehicular distance between the own vehicle MV and the other vehicle OV, as illustrated in FIG. 8.

<Process at Traveling Control Apparatus 1>

An exemplary procedure of the process to be performed by the traveling control apparatus 1 according to the example embodiment is described below with reference to FIGS. 2 and 3.

Figure 2:
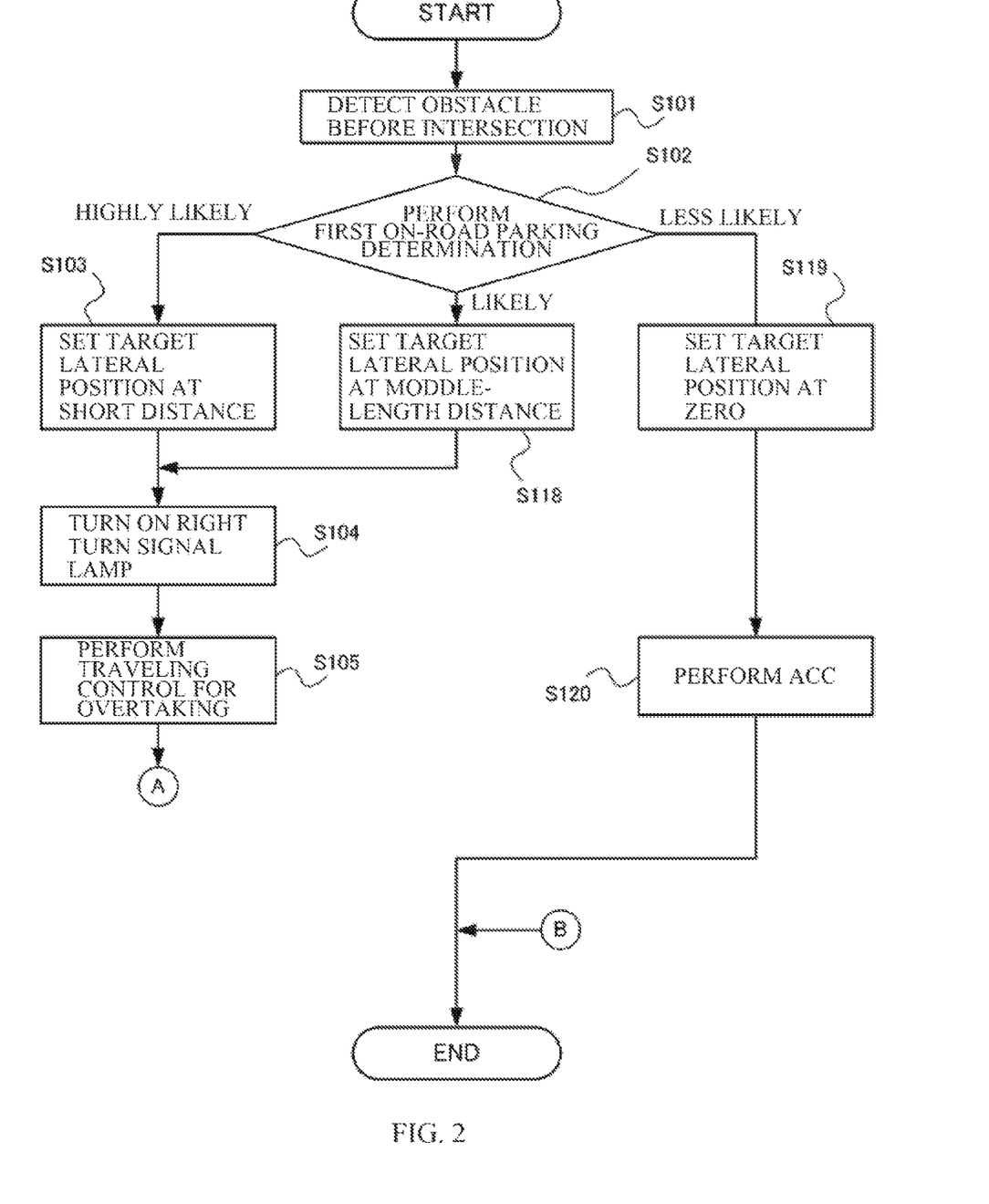
FIG. 2 is a flowchart of a first on-road parking determination process to be performed by the traveling control apparatus according to one example embodiment of the disclosure.
Figure 3:
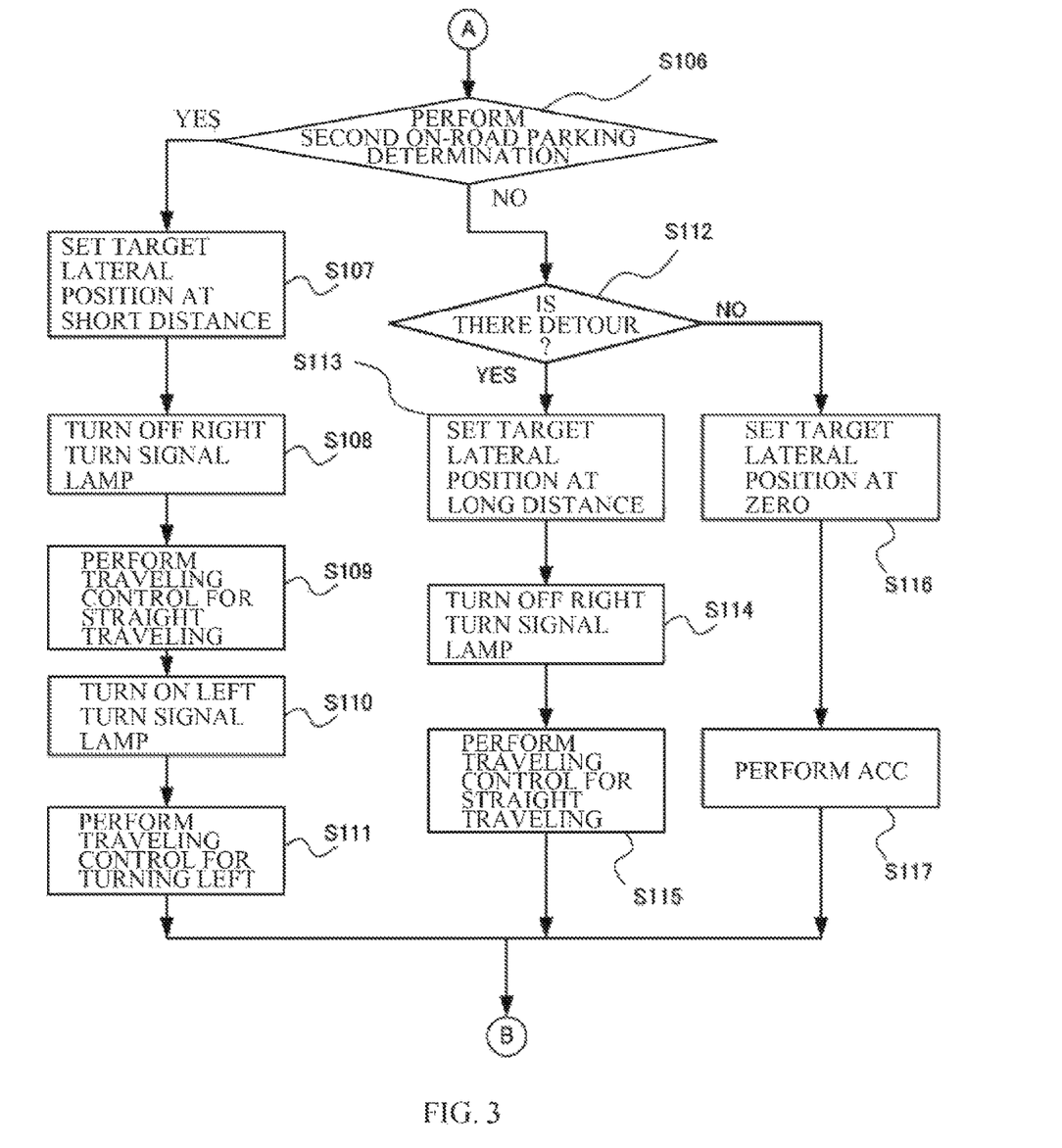
FIG. 3 is a flowchart of a second on-road parking determination process to be performed by the traveling control apparatus according to one example embodiment of the disclosure.

As illustrated in FIG. 2, the obstacle detection unit 110 detects an obstacle present before an intersection in which the own vehicle MV is going to turn left (Step S101). The obstacle detection unit 110 may output data on the detected obstacle to the first on-road parking determination unit 120.

The first on-road parking determination unit 120 performs the first on-road parking determination process to determine the likelihood of the obstacle detected by the obstacle detection unit 110 being the other vehicle OV parked on the road (Step S102).

If it is determined that the other vehicle OV is highly likely to be parked on the road, the first on-road parking determination unit 120 may send the result of the determination to the first target lateral position determination unit 130.

When receiving the result of the determination indicating that the other vehicle OV is highly likely to be parked on the road from the first on-road parking determination unit 120, the first target lateral position determination unit 130 sets the first target lateral position at a short distance from the other vehicle OV (Step S103).

The first target lateral position determination unit 130 may output data on the first target lateral position set at the short distance from the other vehicle OV to the traveling control processor 200.

When receiving the data on the first target lateral position set at the short distance from the other vehicle OV from the first target lateral position determination unit 130, the traveling control processor 200 may perform the control to turn on the right turn signal lamp of the own vehicle MV (Step S104) and the traveling control to cause the own vehicle MV to overtake the other vehicle OV (Step S105).

After the own vehicle MV starts overtaking the other vehicle OV, the second on-road parking determination unit 140 performs the second on-road parking determination to determine whether the obstacle present before the intersection in which the own vehicle MV is going to turn left is the other vehicle OV parked on the road (Step S106). If it is determined that the obstacle is certainly the other vehicle OV parked on the road (Step S106: YES), the second on-road parking determination unit 140 may send the result of the determination to the second target lateral position determination unit 150.

When receiving the result of the determination indicating that the other vehicle OV is parked on the road from the second on-road parking determination unit 140, the second target lateral position determination unit 150 set the second target lateral position at a short distance from the other vehicle OV (Step S107).

The second target lateral position determination unit 150 may output data on the second target lateral position set at the short distance from the other vehicle OV to the traveling control processor 200.

When receiving the data on the second target lateral position set at the short distance from the other vehicle OV from the second target lateral position determination unit 150, the traveling control processor 200 may perform the control to turn off the right turn signal lamp of the own vehicle MV (Step S108) and the traveling control to cause the own vehicle MV to travel straight (Step S109).

The traveling control processor 200 may determine whether the own vehicle MV has reached a target position at which the own vehicle MV is going to turn left (e.g., a position 30 meters before the intersection). If it is determined that the own vehicle MV has reached the target position, the traveling control processor 200 may perform the control to turn on the left turn signal lamp of the own vehicle MV (Step S110) and the traveling control to cause the own vehicle MV to turn left (Step S111), following which the series of the processes may end.

In contrast, if the second on-road parking determination unit 140 determines that the other vehicle OV is not parked on the road (Step S106: NO), the result of the determination may be sent to the detour determination unit 160.

When receiving the result of the determination indicating that the other vehicle OV is not parked on the road from the second on-road parking determination unit 140, the detour determination unit 160 may determine whether there is a detour (Step S112).

If the detour determination unit 160 determines that there is a detour (Step S112: YES), the result of the determination may be sent to the second target lateral position determination unit 150.

When receiving the result of the determination indicating that there is the detour from the detour determination unit 160, the second target lateral position determination unit 150 may set the second target lateral position at a long distance from the other vehicle OV (Step S113).

Thereafter, the second target lateral position determination unit 150 may send the data on the second target lateral position set at the long distance from the other vehicle OV to the traveling control processor 200.

When receiving the data on the second target lateral position set at the long distance from the other vehicle OV from the second target lateral position determination unit 150, the traveling control processor 200 may perform the control to turn off the right turn signal lamp of the own vehicle MV (Step S114) and the traveling control to cause the own vehicle MV to travel straight (Step S115), following which the series of processes may end.

In contrast, if the detour determination unit 160 determines that there is no detour (Step S112: NO), the result of the determination may be sent to the second target lateral position determination unit 150.

When receiving the result of the determination indicating that there is no detour from the detour determination unit 160, the second target lateral position determination unit 150 may set the second target lateral position at zero (0) with respect to the other vehicle OV (Step S116).

The second target lateral position determination unit 150 may send the data on the second target lateral position set at zero (0) with respect to the other vehicle OV to the traveling control processor 200.

When receiving the data on the second target lateral position set at zero (0) with respect to the other vehicle OV from the second target lateral position determination unit 150, the traveling control processor 200 may perform the ACC to keep the inter-vehicular distance between the own vehicle MV and the other vehicle OV (Step S117), following which the series of processes may end.

As illustrated in FIG. 2, when receiving the result of the determination indicating that the other vehicle OV is less likely to be parked on the road from the first on-road parking determination unit 120 (Step S102: LESS LIKELY), the first target lateral position determination unit 130 may set the first target lateral position at zero (0) with respect to the other vehicle OV (Step S119).

The first target lateral position determination unit 130 may send the data on the first target lateral position set at zero (0) with respect to the other vehicle OV to the traveling control processor 200.

When receiving the data on the first target lateral position set at zero (0) with respect to the other vehicle OV from the first target lateral position determination unit 130, the traveling control processor 200 may perform the ACC to keep the inter-vehicular distance between the own vehicle MV and the other vehicle OV (Step S120), following which the series of processes may end.

Further, as illustrated in FIG. 2, when it is determined that the other vehicle OV is likely to be parked on the road (Step S102: LIKELY), the first on-road parking determination unit 120 may send the result of the determination to the first target lateral position determination unit 130.

When receiving the result of the determination indicating that the other vehicle OV is likely to be parked on the road, the first target lateral position determination unit 130 may set the first target lateral position at a middle-length distance from the other vehicle OV (Step S118).

The first target lateral position determination unit 130 may output data on the first target lateral position set at the middle-length distance from the other vehicle OV to the traveling control processor 200.

When receiving the data on the first target lateral position set at the middle-length distance from the other vehicle OV from the first target lateral position determination unit 130, the traveling control processor 200 may perform the control to turn on the right turn signal lamp of the own vehicle MV (Step S104) and the traveling control to cause the own vehicle MV to overtake the other vehicle OV (Step S105).

After the own vehicle MV starts overtaking the other vehicle OV, the second on-road parking determination unit 140 performs the second on-road parking determination to determine whether the obstacle present before the intersection in which the own vehicle MV is going to turn left is the other vehicle OV parked on the road (Step S106). If it is determined that the obstacle is certainly the other vehicle OV parked on the road (Step S106: YES), the second on-road parking determination unit 140 may send the result of the determination to the second target lateral position determination unit 150.

When receiving the result of the determination indicating that the other vehicle OV is parked on the road from the second on-road parking determination unit 140, the second target lateral position determination unit 150 may set the second target lateral position at a short distance from the other vehicle OV (Step S107).

The second target lateral position determination unit 150 may output data on the second target lateral position set at the short distance from the other vehicle OV to the traveling control processor 200.

When receiving the data on the second target lateral position set at the short distance from the other vehicle OV from the second target lateral position determination unit 150, the traveling control processor 200 may perform the control to turn off the right turn signal lamp of the own vehicle MV (Step S108) and the traveling control to cause the own vehicle MV to travel straight (Step S109).

The traveling control processor 200 may determine whether the own vehicle MV has reached a target position at which the own vehicle MV is going to turn left (e.g., a position 30 meters before the intersection). If it is determined that the own vehicle MV has reached the target position, the traveling control processor 200 may perform the control to turn on the left turn signal lamp of the own vehicle MV (Step S110) and the traveling control to cause the own vehicle MV to turn left (Step S111), following which the series of the processes may end.

In contrast, if the second on-road parking determination unit 140 determines that the other vehicle OV is not parked on the road (Step S106: NO), the result of the determination may be sent to the detour determination unit 160.

When receiving the result of the determination indicating that the other vehicle OV is not parked on the road from the second on-road parking determination unit 140, the detour determination unit 160 may determine whether there is a detour (Step S112).

If the detour determination unit 160 determines that there is a detour (Step S112: YES), the result of the determination may be sent to the second target lateral position determination unit 150.

When receiving the result of the determination indicating that there is the detour from the detour determination unit 160, the second target lateral position determination unit 150 may set the second target lateral position at a long distance from the other vehicle OV (Step S113).

Thereafter, the second target lateral position determination unit 150 may send the data on the second target lateral position set at the long distance from the other vehicle OV to the traveling control processor 200.

When receiving the data on the second target lateral position set at the long distance from the other vehicle OV from the second target lateral position determination unit 150, the traveling control processor 200 may perform the control to turn off the right turn signal lamp of the own vehicle MV (Step S114) and the traveling control to cause the own vehicle MV to travel straight (Step S115), following which the series of processes may end.

In contrast, if the detour determination unit 160 determines that there is no detour (Step S112: NO), the result of the determination may be sent to the second target lateral position determination unit 150.

When receiving the result of the determination indicating that there is no detour from the detour determination unit 160, the second target lateral position determination unit 150 may set the second target lateral position at zero (0) with respect to the other vehicle OV (Step S116).

The second target lateral position determination unit 150 may send the data on the second target lateral position set at zero (0) with respect to the other vehicle OV to the traveling control processor 200.

When receiving the data on the second target lateral position set at zero (0) with respect to the other vehicle OV from the second target lateral position determination unit 150, the traveling control processor 200 may perform the ACC to keep the inter-vehicular distance between on the own vehicle MV and the other vehicle OV (Step S117), following which the series of processes may end.

<Workings and Effects>

As described above, the traveling control apparatus 1 according to the example embodiment of the disclosure includes the obstacle detection unit 110, the detour determination unit 160, the first on-road parking determination unit 120, the first target lateral position determination unit 130, the second on-road parking determination unit 140, the second target lateral position determination unit 150, and the traveling control processor 200. The obstacle detection unit 110 detects an obstacle present before an intersection and in left front of the own vehicle MV. When the own vehicle MV is hindered by the obstacle from turning left at the intersection, the detour determination unit 160 determines whether there is a detour. When the obstacle is detected, the first on-road parking determination unit 120 determines the likelihood of the obstacle being the other vehicle OV parked on the road. When the first on-road parking determination unit 120 determines that the other vehicle OV is highly likely or likely to be parked on the road, the first target lateral position determination unit 130 determines the first target lateral position along which the own vehicle MV is to travel to pass by the other vehicle OV. After the own vehicle MV starts overtaking the other vehicle OV, the second on-road parking determination unit 140 determines whether the obstacle is the other vehicle OV parked on the road. When the second on-road parking determination unit 140 determines that the obstacle is the other vehicle OV parked on the road, the second target lateral position determination unit 150 determines the second target lateral position along which the own vehicle MV is to travel to pass by the other vehicle OV. When the second on-road parking determination unit 140 determines that the obstacle is not the other vehicle OV parked on the road and the detour determination unit 160 determines that there is a detour, the second target lateral position determination unit 150 determines the third target lateral position along which the own vehicle MV is to travel to pass by the other vehicle OV. The traveling control processor 200 performs the traveling control of the own vehicle MV based on the result of determining by the first target lateral position determination unit 130 or the result of determining by the second target lateral position determination unit. The traveling control of the own vehicle MV includes the traveling control to cause the own vehicle MV to overtake the other vehicle OV, the traveling control to cause the own vehicle MV to travel straight, the traveling control to cause the own vehicle MV to turn left, the traveling control to cause the own vehicle MV to travel on the detour, and the adaptive cruise control to keep an inter-vehicular distance between the own vehicle MV and the other vehicle OV.

That is, when the obstacle is detected before the intersection and in left front of the own vehicle MV, the first on-road parking determination unit 120 determines the likelihood of the obstacle being the other vehicle OV parked on the road. When the first on-road parking determination unit 120 determines that the obstacle is highly likely or likely to be the other vehicle OV parked on the road, the first target lateral position determination unit 130 determines the first target lateral position along which the own vehicle MV is to travel to pass by the other vehicle OV. Based on the result of determining by the first target lateral position determination unit 130, the traveling control processor 200 performs the traveling control to cause the own vehicle MV to overtake the other vehicle OV.

Accordingly, when the obstacle present before the intersection and in left front of the own vehicle MV is highly likely or likely to be the other vehicle OV parked on the road, the first target lateral position determination unit 130 determines the first target lateral position along which the own vehicle MV is to travel to overtake the other vehicle OV, and the traveling control processor 200 performs the traveling control to cause the own vehicle MV to overtake the other vehicle OV along the first target lateral position. This allows the own vehicle MV to pass through the narrow space before the intersection in accordance with the width of the road on which the own vehicle MV is traveling, enabling traveling assistance to the destination.

Further, after the own vehicle MV starts overtaking the other vehicle OV, the second on-road parking determination unit 140 determines whether the obstacle is the other vehicle OV parked on the road. When the second on-road parking determination unit 140 determines that the obstacle is the other vehicle OV parked on the road, the second target lateral position determination unit 150 determines the second target lateral position along which the own vehicle MV is to travel to pass by the other vehicle OV. When the second on-road parking determination unit 140 determines that the obstacle is not the other vehicle OV parked on the road and the detour determination unit 160 determines that there is a detour, the second target lateral position determination unit 150 determines the third target lateral position along which the own vehicle MV is to travel to pass by the other vehicle OV. Based on the result of determining by the second target lateral position determination unit 150, the traveling control processor 200 performs the traveling control to cause the own vehicle MV to overtake the other vehicle OV or the traveling control to cause the own vehicle MV to travel on the detour.

That is, after performing the traveling control to cause the own vehicle MV to overtake the other vehicle OV based on the result of determining by the first target lateral position determination unit 130, the traveling control processor 200 further determines whether the traveling control to cause the own vehicle MV to overtake the other vehicle OV or the traveling control to cause the own vehicle MV to travel on the detour is to be performed based on the result of determining by the second target lateral position determination unit 150. If it is determined that the traveling control is to be performed, the traveling control processor 200 performs the traveling control based on the result of determining by the second target lateral position determination unit 150.

Accordingly, the traveling control processor 200 is able to perform the traveling control of the own vehicle MV after properly determining whether the obstacle present before the intersection and in left front of the own vehicle MV is the other vehicle OV parked on the road. This allows the own vehicle to pass through the narrow space before the intersection in accordance with the width of the road on which the own vehicle MV is traveling, enabling the traveling assistance to the destination.

Further, since the traveling control processor 200 performs the traveling control of the own vehicle MV as descried above, it is possible to control the own vehicle MV depending on a peripheral environment. This secures safety of people on a peripheral road.

Further, when the first on-road parking determination unit 120 determines that the obstacle is highly likely or likely to be the other vehicle OV parked on the road, the traveling control processor 200 of the traveling control apparatus 1 according to the example embodiment of the disclosure may perform the control to turn on the right turn signal lamp of the own vehicle MV and the traveling control to cause the own vehicle MV to travel along the first target lateral position to overtake the other vehicle OV. Thereafter, when the second on-road parking determination unit 140 determines that the obstacle is the other vehicle OV parked on the road, the traveling control processor 200 may perform the control to turn off the right turn signal lamp of the own vehicle MV and the traveling control to cause the own vehicle MV to travel straight or turn left along the second target lateral position.

Accordingly, when the obstacle is highly likely or likely to be the other vehicle OV parked on the road, the traveling control processor 200 achieves safety traveling of the own vehicle MV on a narrow space and the traveling assistance of the own vehicle MV to the destination by automatically controlling the lateral position of the own vehicle MV with respect to the other vehicle OV, operations of the turn signal lamps, and timings of operating the turn signal lamps.

Further, since the traveling control processor 200 performs the traveling control described above, it is possible to control the own vehicle MV depending on the peripheral environment. This secures safety of people on the peripheral road.

Further, when the first on-road parking determination unit 120 determines that the obstacle is highly likely or likely to be the other vehicle OV parked on the road, the traveling control processor 200 of the traveling control apparatus 1 according to the example embodiment of the disclosure may perform the control to turn on the right turn signal lamp of the own vehicle MV and the traveling control to cause the own vehicle MV to travel along the first target lateral position to overtake the other vehicle OV. Thereafter, when the second on-road parking determination unit 140 determines that the other vehicle OV is not parked on the road and the detour determination unit 160 determines that there is a detour, the traveling control processor 200 may perform the traveling control to cause the own vehicle MV to travel on the detour along the second target lateral position. When the second on-road parking determination unit 140 determines that the other vehicle OV is not parked on the road and the detour determination unit 160 determines that there is no detour, the traveling control processor 200 may perform the ACC to keep the inter-vehicular distance between the own vehicle MV and the other vehicle OV.

That is, when the first on-road parking determination unit 120 determines that the obstacle is highly likely or likely to be the other vehicle OV parked on the road, the traveling control processor 200 performs the control to turn on the right turn signal lamp and the traveling control to cause the own vehicle MV to overtake the other vehicle OV. In contrast, when the second on-road parking determination unit 140 determines that the other vehicle OV is not parked on the road, the traveling control processor 200 changes the traveling control mode based on the result of the determination by the detour determination unit 160.

Accordingly, the traveling control processor 200 is able to perform optimal control of the own vehicle MV depending on situations. It is therefore possible to control the own vehicle MV depending on the peripheral environment. This secures safety of people on the peripheral road.

Further, the traveling control processor 200 may appropriately notify an occupant in the own vehicle MV of the change in the traveling control mode. This allows the occupant to recognize a current situation, making the occupant feel safe.

Further, when the first on-road parking determination unit 120 determines that the obstacle is less likely to be the other vehicle OV parked on the road, the traveling control processor 200 of the traveling control apparatus 1 according to the example embodiment of the disclosure performs the ACC to keep the inter-vehicular distance between the own vehicle MV and the other vehicle OV.

Accordingly, the traveling control processor 200 is able to perform optimal control of the own vehicle MV depending on situations. It is therefore possible to control the own vehicle MV depending on the peripheral environment. This secures safety of people on the peripheral road.

Further, the traveling control processor 200 may appropriately notify the occupant in the own vehicle MV of the change in the traveling control mode. This allows the occupant to recognize a current situation, making the occupant feel safe.

Further, the first on-road parking determination unit 120 and the second on-road parking determination unit 140 of the traveling control apparatus 1 according to the example embodiment of the disclosure may determine whether the other vehicle OV is parked on the road based on the information on the other vehicle OV. The information on the other vehicle OV may include a dynamic behavior of the other vehicle OV, a lighting state of a hazard lamp of the other vehicle OV, a lighting state of a turn signal lamp of the other vehicle OV, a direction indicated by a turn signal lamp of the other vehicle OV, an orientation of a wheel of the other vehicle OV, the presence of a driver in the other vehicle OV, and a behavior of the driver in the other vehicle OV.

That is, the first on-road parking determination unit 120 and the second on-road parking determination unit 140 may determine whether the other vehicle OV is parked on the road by evaluating various possible factors.

Accordingly, it is expected that accurate determination as to whether the other vehicle OV is parked on the road is made by the first on-road parking determination unit 120 and the second on-road parking determination unit 140. It is therefore possible for the traveling control processor 200 to control the own vehicle MV depending on the peripheral environment. This secures safety of people on the peripheral road.

Modification Example 1

In the example embodiment described above, when the first on-road parking determination unit 120 determines that the other vehicles OV1 and OV2 are highly likely or likely to be parked on the road, the traveling control processor 200 may turn on the right turn signal lamp three seconds before the own vehicle MV is moved laterally to overtake the other vehicles OV1 and OV2. However, the traveling control processor 200 may perform the control to turn on the right turn signal lamp at an earlier timing.

Turning on the right turn signal lamp at an earlier timing makes it possible to achieve the traveling control of the own vehicle MV further responding to the peripheral environment. This secures safety of people on the peripheral road.

Note that it is possible to implement the traveling control apparatus 1 of the example embodiment of the disclosure by recording the process to be executed by the traveling control processor 200 on a non-transitory recording medium readable by a computer system, and causing the computer system to load the program recorded on the non-transitory recording medium onto the traveling control processor 200 to execute the program. The computer system as used herein may encompass an operating system (OS) and hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more of the obstacle detection unit 110, the detour determination unit 160, the first on-road parking determination unit 120, the first target lateral position determination unit 130, the second on-road parking determination unit 140, the second target lateral position determination unit 150, and the traveling control processor 200 in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the obstacle detection unit 110, the detour determination unit 160, the first on-road parking determination unit 120, the first target lateral position determination unit 130, the second on-road parking determination unit 140, the second target lateral position determination unit 150, and the traveling control processor 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM.

The ASIC is an integrated circuit (IC) customized to perform, and the FPGA is an integrated circuit designed to be configured after manufacturing in order to perform, all or a part of the obstacle detection unit 110, the detour determination unit 160, the first on-road parking determination unit 120, the first target lateral position determination unit 130, the second on-road parking determination unit 140, the second target lateral position determination unit 150, and the traveling control processor 200 in FIG. 1.

The invention claimed is:

1. A traveling control apparatus configured to perform traveling control of a first vehicle to which the traveling control apparatus is applied at an intersection of a road where the first vehicle is going to turn right, the traveling control apparatus comprising:
    an obstacle detection unit configured to detect an obstacle present before the intersection and in right front of the first vehicle;
    a detour determination unit configured to determine whether there is a detour when the first vehicle is hindered by the obstacle from turning right at the intersection;
    a first on-road parking determination unit configured to perform, when the obstacle is detected, a first on-road parking determination process to determine a likelihood of the obstacle being a second vehicle parked on the road;
    a first target lateral position determination unit configured to determine a first target lateral position relative to the second vehicle, wherein the first vehicle is controlled to travel along a path that passes through the first target lateral position to pass by the second vehicle when the first on-road parking determination unit determines that the obstacle is highly likely or likely to be the second vehicle parked on the road based on a predetermined threshold;
    a second on-road parking determination unit configured to perform a second on-road parking determination process to determine whether the obstacle is the second vehicle parked on the road after the first vehicle starts overtaking the second vehicle;
    a second target lateral position determination unit configured to:
        determine a second target lateral position relative to the second vehicle, wherein the first vehicle is controlled to travel along a path that passes through the second target lateral position to pass by the second vehicle when the second on-road parking determination unit determines that the obstacle is the second vehicle parked on the road; and
        determine a third target lateral position relative to the obstacle, wherein the first vehicle is controlled to travel along a path that passes through the third target lateral position to pass by the second vehicle when the second on-road parking determination unit determines that the obstacle is not the second vehicle parked on the road and the detour determination unit determines that there is the detour, wherein the third target lateral position is set at a longer lateral distance from the second vehicle than each of the first target lateral position and the second target lateral position; and
    a traveling control processor configured to perform the traveling control of the first vehicle based on a result of determining by the first target lateral position determination unit or a result of determining by the second target lateral position determination unit, the traveling control of the first vehicle comprising traveling control to cause the first vehicle to overtake the second vehicle, traveling control to cause the first vehicle to travel straight, traveling control to cause the first vehicle to turn right, traveling control to cause the first vehicle to travel on the detour, and adaptive cruise control to keep an inter-vehicular distance between the first vehicle and the second vehicle.

2. The traveling control apparatus according to claim 1, wherein
    the traveling control processor is configured to
    perform, when the first on-road parking determination unit determines that the obstacle is highly likely or likely to be the second vehicle parked on the road, control to turn on a left turn signal lamp of the first vehicle and the traveling control to cause the first vehicle to overtake the second vehicle along the first target lateral position, and
    perform, when the second on-road parking determination unit determines that the obstacle is the second vehicle parked on the road, control to turn off the left turn signal lamp of the first vehicle, the traveling control to cause the first vehicle to travel straight along the second target lateral position, and the traveling control to cause the first vehicle to turn right along the second target lateral position.

3. The traveling control apparatus according to claim 2, wherein
    the traveling control processor is configured to
    perform, when the second on-road parking determination unit determines that the obstacle is not the second vehicle parked on the road and the detour determination unit determines that there is the detour, the traveling control to cause the first vehicle to travel on the detour along the second target lateral position, and
    perform, when the second on-road parking determination unit determines that the obstacle is not the second vehicle parked on the road and the detour determination unit determines that there is no detour, the adaptive cruise control to keep the inter-vehicular distance between the first vehicle and the second vehicle.

4. The traveling control apparatus according to claim 3, wherein the traveling control processor performs, when the first on-road parking determination unit determines that the obstacle is less likely to be the second vehicle parked on the road based on the predetermined threshold, the adaptive cruise control to keep the inter-vehicular distance between the first vehicle and the second vehicle.

5. The traveling control apparatus according to claim 1, wherein the first on-road parking determination unit and the second on-road parking determination unit are each configured to determine whether the obstacle is the second vehicle parked on the road based on indices on the second vehicle, the indices on the second vehicle comprising a dynamic behavior of the second vehicle, a lighting state of a hazard lamp of the second vehicle, a lighting state of a turn signal lamp of the second vehicle, a direction indicated by the turn signal lamp of the second vehicle, an orientation of a wheel of the second vehicle, presence of a driver in the second vehicle, and a behavior of the driver in the second vehicle.

6. The traveling control apparatus according to claim 2, wherein the first on-road parking determination unit and the second on-road parking determination unit are each configured to determine whether the obstacle is the second vehicle parked on the road based on indices on the second vehicle, the indices on the second vehicle comprising a dynamic behavior of the second vehicle, a lighting state of a hazard lamp of the second vehicle, a lighting state of a turn signal lamp of the second vehicle, a direction indicated by the turn signal lamp of the second vehicle, an orientation of a wheel of the second vehicle, presence of a driver in the second vehicle, and a behavior of the driver in the second vehicle.

7. The traveling control apparatus according to claim 3, wherein the first on-road parking determination unit and the second on-road parking determination unit are each configured to determine whether the obstacle is the second vehicle parked on the road based on indices on the second vehicle, the indices on the second vehicle comprising a dynamic behavior of the second vehicle, a lighting state of a hazard lamp of the second vehicle, a lighting state of a turn signal lamp of the second vehicle, a direction indicated by the turn signal lamp of the second vehicle, an orientation of a wheel of the second vehicle, presence of a driver in the second vehicle, and a behavior of the driver in the second vehicle.

8. The traveling control apparatus according to claim 4, wherein the first on-road parking determination unit and the second on-road parking determination unit are each configured to determine whether the obstacle is the second vehicle parked on the road based on indices on the second vehicle, the indices on the second vehicle comprising a dynamic behavior of the second vehicle, a lighting state of a hazard lamp of the second vehicle, a lighting state of a turn signal lamp of the second vehicle, a direction indicated by the turn signal lamp of the second vehicle, an orientation of a wheel of the second vehicle, presence of a driver in the second vehicle, and a behavior of the driver in the second vehicle.

9. A traveling control apparatus configured to perform traveling control of a first vehicle to which the traveling control apparatus is applied at an intersection of a road where the first vehicle is going to turn right, the traveling control apparatus comprising
circuitry configured to:
detect an obstacle present before the intersection and in right front of the first vehicle;
perform a detour determination as to whether there is a detour when the first vehicle is hindered by the obstacle from turning right at the intersection;
upon detecting the obstacle, perform a first on-road parking determination process to determine a likelihood of the obstacle being a second vehicle parked on the road,
upon determining in the first on-road parking determination process that the obstacle is highly likely or likely to be the second vehicle parked on the road based on a predetermined threshold, perform a first target lateral position determination process to determine a first target lateral position relative to the second vehicle, wherein the first vehicle is controlled to travel along a path that passes through the first target lateral position to pass by the second vehicle;
perform a second on-road parking determination process to determine whether the obstacle is the second vehicle parked on the road after the first vehicle starts overtaking the second vehicle;
perform a second target lateral position determination process to:
upon determining in the second on-road parking determination process that the obstacle is the second vehicle parked on the road, determine a second target lateral position relative to the second vehicle, wherein the first vehicle is controlled to travel along a path that passes through the second target lateral position to pass by the second vehicle; and
upon determining in the second on-road parking determination process that the obstacle is not the second vehicle parked on the road and determining in the detour determination that there is the detour, determine a third target lateral position relative to the obstacle, wherein the first vehicle is controlled to travel along a path that passes through the third target lateral position to pass by the second vehicle, "wherein the third target lateral position is set at a longer lateral distance from the second vehicle than each of the first target lateral position and the second target lateral position; and
perform traveling control of the first vehicle based on a result of the first target lateral position determination process or a result of the second target lateral position determination process, the traveling control of the first vehicle comprising traveling control to cause the first vehicle to overtake the second vehicle, traveling control to cause the first vehicle to travel straight, traveling control to cause the first vehicle to turn right, traveling control to cause the first vehicle to travel on the detour, and adaptive cruise control to keep an inter-vehicular distance between the first vehicle and the second vehicle.

10. The apparatus according to claim 5, wherein each of the first on-road parking determination unit and the second on-road parking determination unit is configured to calculate an evaluation value for determining whether the obstacle is the second vehicle parked on the road, by assigning weights selected ones of the indices on the second vehicle.

11. The apparatus according to claim 10, wherein each of the first on-road parking determination unit and the second on-road parking determination unit is configured to assign a greater weight to the presence of the driver in the second vehicle among the indices on the second vehicle.

12. The apparatus according to claim 1, wherein the second on-road parking determination process is executed after the first vehicle starts overtaking the second vehicle.

13. A traveling control apparatus configured to perform traveling control of a first vehicle to which the traveling control apparatus is applied at an intersection of a road where the first vehicle is going to turn right, the traveling control apparatus comprising:
an obstacle detection unit configured to detect an obstacle present before the intersection and in right front of the first vehicle;
a detour determination unit configured to determine whether there is a detour when the first vehicle is hindered by the obstacle from turning right at the intersection;
a first on-road parking determination unit configured to perform, when the obstacle is detected, a first on-road parking determination process to determine whether the obstacle is a second vehicle parked on the road;
a first target lateral position determination unit configured to determine a first target lateral position relative to the second vehicle, wherein the first vehicle is controlled to travel along a path that passes through the first target lateral position to pass by the second vehicle when the first on-road parking determination unit determines that the obstacle is the second vehicle parked on the road;
a second on-road parking determination unit configured to perform a second on-road parking determination process to determine whether the obstacle is the second vehicle parked on the road after the first vehicle starts overtaking the second vehicle;
a second target lateral position determination unit configured to:

determine a second target lateral position relative to the second vehicle, wherein the first vehicle is controlled to travel along a path that passes through the second target lateral position to pass by the second vehicle when the second on-road parking determination unit determines that the obstacle is the second vehicle parked on the road; and determine a third target lateral position relative to the obstacle, wherein the first vehicle is controlled to travel along a path that passes through the third target lateral position to pass by the second vehicle when the second on-road parking determination unit determines that the obstacle is not the second vehicle parked on the road and the detour determination unit determines that there is the detour, wherein the third target lateral position is set at a longer lateral distance from the second vehicle than each of the first target lateral position and the second target lateral position; and a traveling control processor configured to perform the traveling control of the first vehicle based on a result of determining by the first target lateral position determination unit or a result of determining by the second target lateral position determination unit, the traveling control of the first vehicle comprising traveling control to cause the first vehicle to overtake the second vehicle, traveling control to cause the first vehicle to travel straight, traveling control to cause the first vehicle to turn right, traveling control to cause the first vehicle to travel on the detour, and adaptive cruise control to keep an inter-vehicular distance between the first vehicle and the second vehicle.

14. The traveling control apparatus according to claim 13, wherein the traveling control processor is configured to perform, when the first on road parking determination unit determines that the obstacle is the second vehicle parked on the road, control to turn on a left turn signal lamp of the first vehicle and the traveling control to cause the first vehicle to overtake the second vehicle along the first target lateral position, and perform, when the second on road parking determination unit determines that the obstacle is the second vehicle parked on the road, control to turn off the left turn signal lamp of the first vehicle, the traveling control to cause the first vehicle to travel straight along the second target lateral position, and the traveling control to cause the first vehicle to turn right along the second target lateral position.

15. The traveling control apparatus according to claim 14, wherein the traveling control processor is configured to perform, when the second on road parking determination unit determines that the obstacle is not the second vehicle parked on the road and the detour determination unit determines that there is the detour, the traveling control to cause the first vehicle to travel on the detour along the second target lateral position, and perform, when the second on road parking determination unit determines that the obstacle is not the second vehicle parked on the road and the detour determination unit determines that there is no detour, the adaptive cruise control to keep the inter vehicular distance between the first vehicle and the second vehicle.

16. The traveling control apparatus according to claim 15, wherein the traveling control processor performs, when the first on-road parking determination unit determines that the obstacle is not the second vehicle parked on the road, the adaptive cruise control to keep the inter-vehicular distance between the first vehicle and the second vehicle.

17. The traveling control apparatus according to claim 13, wherein the first on-road parking determination unit and the second on road parking determination unit are each configured to determine whether the obstacle is the second vehicle parked on the road based on indices on the second vehicle, the indices on the second vehicle comprising a dynamic behavior of the second vehicle, a lighting state of a hazard lamp of the second vehicle, a lighting state of a turn signal lamp of the second vehicle, a direction indicated by the turn signal lamp of the second vehicle, an orientation of a wheel of the second vehicle, presence of a driver in the second vehicle, and a behavior of the driver in the second vehicle.

18. The traveling control apparatus according to claim 14, wherein the first on-road parking determination unit and the second on-road parking determination unit are each configured to determine whether the obstacle is the second vehicle parked on the road based on indices on the second vehicle, the indices on the second vehicle comprising a dynamic behavior of the second vehicle, a lighting state of a hazard lamp of the second vehicle, a lighting state of a turn signal lamp of the second vehicle, a direction indicated by the turn signal lamp of the second vehicle, an orientation of a wheel of the second vehicle, presence of a driver in the second vehicle, and a behavior of the driver in the second vehicle.

19. The traveling control apparatus according to claim 15, wherein the first on-road parking determination unit and the second on road parking determination unit are each configured to determine whether the obstacle is the second vehicle parked on the road based on indices on the second vehicle, the indices on the second vehicle comprising a dynamic behavior of the second vehicle, a lighting state of a hazard lamp of the second vehicle, a lighting state of a turn signal lamp of the second vehicle, a direction indicated by the turn signal lamp of the second vehicle, an orientation of a wheel of the second vehicle, presence of a driver in the second vehicle, and a behavior of the driver in the second vehicle.

20. The traveling control apparatus according to claim 16, wherein the first on road parking determination unit and the second on road parking determination unit are each configured to determine whether the obstacle is the second vehicle parked on the road based on indices on the second vehicle, the indices on the second vehicle comprising a dynamic behavior of the second vehicle, a lighting state of a hazard lamp of the second vehicle, a lighting state of a turn signal lamp of the second vehicle, a direction indicated by the turn signal lamp of the second vehicle, an orientation of a wheel of the second vehicle, presence of a driver in the second vehicle, and a behavior of the driver in the second vehicle.

* * * * *